United States Patent

[11] 3,586,424

| [72] | Inventors | George F. Schenk<br>Williamsville;<br>Milton H. Sussman, Buffalo, both of, N.Y. |
|---|---|---|
| [21] | Appl. No. | 759,651 |
| [22] | Filed | Sept. 13, 1968 |
| [45] | Patented | June 22, 1971 |
| [73] | Assignee | American Optical Corporation<br>Southbridge, Mass. |

[54] MONOCULAR INDIRECT OPHTHALMOSCOPE
2 Claims, 6 Drawing Figs.

[52] U.S. Cl. ..................................................... 351/9,
351/14, 351/16
[51] Int. Cl. ....................................................... A61b 3/12
[50] Field of Search ........................................ 351/1, 6, 7,
9, 10, 13—16; 350/40—43, 184

[56] References Cited
UNITED STATES PATENTS

| 2,014,888 | 9/1935 | Forshey | 351/16 X |
| 3,016,000 | 1/1962 | Noyori | 351/7 X |
| 3,035,483 | 5/1962 | Andreas et al. | 351/16 X |
| 3,045,545 | 7/1962 | Korones et al. | 350/42 X |
| 2,902,911 | 9/1959 | Noyori | 351/7 X |
| 3,019,699 | 2/1962 | Schenk | 351/12 |
| 3,438,689 | 4/1969 | Wehr | 350/184 |

OTHER REFERENCES

Bausch & Lomb Optical Co. SCIENTIFIC AND TECHNICAL PUBLICATIONS, "Large Gullstrand Ophthalmoscope with Electric Illumination for the Examination of the Fundus Oculi with Stereoscopic Effect," 1915 (351-6)

Berte, A.P., " The Dudragne-Francon Ophthalmoscope," THE OPTICIAN, Vol. CXII, Issue 3151, pp. 125— 126, 8/24, 1951 (351-6)
Schurmer, " Upright Fundus...Ophthalmoscopy," ARCHIVES OF OPHTHALM. Vol. 77, pp. 67— 70, Jan. 1967 (351-6)

Primary Examiner—John K. Corbin
Assistant Examiner—Paul A. Sacher
Attorneys—William C. Nealon, Noble S. Williams and Robert J. Bird ABSTRACT: An ophthalmoscope of the indirect monocular type including an illumination system contained within the handle of the instrument, a viewing system contained within the viewing section of the instrument and a beam splitter contained within the bridge of the instrument, the bridge interconnecting the handle and the viewing section. The beam splitter reflects illumination to the patient's retina and transmits the rays from the illuminated retina to the practitioner. The viewing system has a magnification less than unity with an adjustable focus to correct for refractive errors of the eyes of both patient and practitioner. The viewing system erects the inverted, reversed image of the patient's retina. The several controls on the instrument determining the field of illumination, the illumination wave length and adjusting focus are grouped for convenient one-handed manipulation by the practitioner.

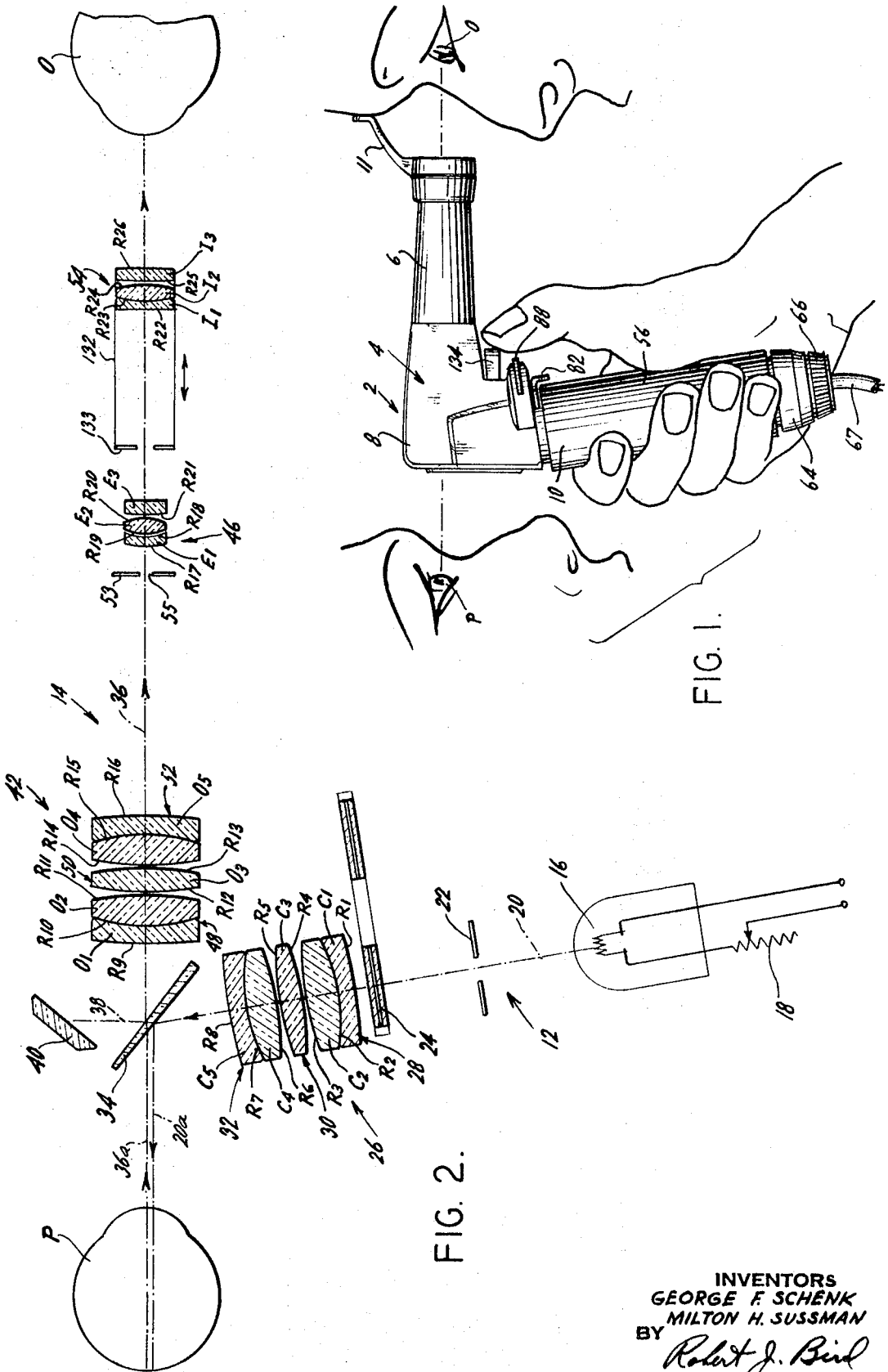

INVENTORS
GEORGE F. SCHENK
MILTON H. SUSSMAN
BY
Robert J. Bird
ATTORNEY

MONOCULAR INDIRECT OPHTHALMOSCOPE

The present invention relates to ophthalmoscopes, and more specifically, to a monocular indirect ophthalmoscope of new and improved design, making it an especially valuable instrument for the physician in the practice of ophthalmology.

Historically, the retina of a patient is examined by an instrument known as the "direct" ophthalmoscope. This instrument provides a source of illumination for the retina whose image is essentially at infinity. The visualization is done merely by having the practitioner look through the patient's eye, with no optical aid.

The system in the direct ophthalmoscope for introducing light through the pupil of the patient's eye involves a light source out of the pracitioner's field of view and an optical system, including a mirror, to image the light source in the plane of the pupil. The practitioner views directly into the pupil along a line of sight somewhat offset and above the path of the illuminating beam. In this type of instrument, without an optical system between the eyes of patient and practitioner, it is impossible to conjugate the practitioner's pupil with the patient's pupil. Such conjugation would bring about a larger and improved field and would eliminate the introduction of shadows.

It has been suggested in the literature that consideration be given to utilizing similar illumination to that used in the traditional direct ophthalmoscope and, in addition, imposing between the patient's eye and the practitioner's eye a telescope of unity magnification. This suggestion produces conjugate imagery, thereby avoiding the problem normally encountered in the direct ophthalmoscope, that is, nonconjugation of pupils. However, the total magnification is approximately 15X since the magnification of the eye is of itself approximately 15X. Utilization of an instrument having such high magnification leads to difficulty. The pupil of the patient's eye is conjugated with the practitioner's eye at unity magnification, avoiding vignetting. However, with a one-to-one alignment of the practitioner's pupil and the patient's pupil at the practitioner's pupil, it becomes rather critical to properly aim and align the instrument for viewing. Misalignment brings about similar disadvantages as nonconjugation.

Another approach to viewing of the retina of a patient's eye has resulted in an instrument called an "indirect" ophthalmoscope in which visualization is conventionally binocular. The instrument consists of an objective lens system which is hand held at approximately the focal length of the objective from the pupil of the patient's eye. The image of the retina in an emmetropic eye is then at the other conjugate focal point of this lens. This aerial image is then examined at the magnification obtained at, for example, normal reading distance. The illumination for this instrument is provided by a helmet-mounted lamp, lens, and mirror system. This system has the disadvantage that the objective lens, an important component of the optical system, is hand held, making alignment of the optical system difficult and requiring a long learning period for proper utilization of the instrument.

The present application discloses a new and improved monocular indirect ophthalmoscope featuring an optical system wherein the illumination path is close to the axis of the viewing path. This enables entry into small pupils, enables clearing small cataracts and flaws usually found at the peripheries of the lenses of the optical system, and in general, makes the aiming of the illumination path easy for the practitioner.

The foregoing is obtained by the provision of an indirect ophthalmoscope in the form of an integrated lightweight finger-controlled instrument which may be held and operated by only one hand of the practitioner. The instrument includes, in a single unit, a light source and an associated lens system, and a viewing lens system. The instrument's mechanisms are operated by controls externally mounted on the instrument so that they can be manipulated by the fingers of the hand holding the instrument. The practitioner's other hand is free to control the patient.

Prior instruments utilized a viewing lens which formed a relatively large diameter image of the patient's pupil in the plane of the observer's pupil. When the observer's pupil was small, a portion of this image would be blocked out, and even with pupils of normal size, loss of light by vignetting would be large. The present instrument has an optical system which forms an image of the patient's pupil at the plane of the observer's pupil which is small in diameter. This enables ease of view through the aforesaid small pupils with the patient's pupil, eliminating vignetting.

The foregoing disadvantage, namely that the patient's pupil was of relatively large diameter when it was imaged in the plane of the pracitioner's pupil, made it difficult, if not impossible, to separate the illumination light path from the observation path as they passed through the patient's cornea and crystalline lens. The monocular indirect ophthalmoscope of the present invention, by conjugating the practitioner's pupil at the patient's pupil and holding this image to a relatively small area, and further directing the illumination path and observation path along separate but essentially parallel courses, achieves essentially a reflex-free field of view.

It is the primary object of the present invention to provide a monocular indirect ophthalmoscope with an optical system which images a light source in the pupil and conjugates the practitioner's pupil with the patient's pupil with these images being relatively small and separated to provided reflection-free viewing of the patient's eye fundus by the practitioner.

It is another object of the present invention to provide a monocular indirect ophthalmoscope which provides the practitioner with an erect image of the fundus of the patient's eye. With such a feature, the user of the instrument is able to correspondingly coordinate the movement of the instrument with the portion of the fundus which he desires to locate and observe, in exactly the same way as is the case with a direct ophthalmoscope. The initial difficulty experienced by some practitioners, and especially by students, when manipulating an indirect ophthalmoscope with an inverted and reversed image, is obviated with the instrument of the present invention.

It is another important object of the present invention to provide a monocular indirect ophthalmoscope enabling magnification of the patient's fundus in the range of 5X, and concurrently providing a relatively large illuminated field of view. With the lens system of the present ophthalmoscope, the practitioner is presented with a field of view nine times greater in area than is achieved with a comparable direct ophthalmoscope.

It is still a further object of the present invention to provide a monocular indirect ophthalmoscope which is self-illuminating, that is, contains a light source and a power connector. The beam of light from the light source is precentered and prefocused, and is of high intensity. Moreover, the light source path is distant from and separate from the viewing optical path, as these paths enter and exit the patient's pupil. A condensing lens system within the instrument assures bright, even illumination over the entire portion of the fundus under observation.

It is yet another object of the present invention to provide a monocular indirect ophthalmoscope wherein the instrument includes a built-in rheostat which enables continuous variation of the intensity of the light beam directed into the eye of the patient so that even during observation of the fundus, the practitioner may continuously alter the light intensity and thus observe the fundus under any desired degree of illumination.

It is yet a further object of the present invention to provide a monocular indirect ophthalmoscope wherein an iris diaphragm is contained within the instrument along the optical path from the light source to the patient's eye, the diaphragm permitting continuously variable and precise adjustment of the illuminated field of view without loss of image.

It is still a further object of the present invention to provide a monocular indirect ophthalmoscope which includes a battery of color filters, each of which may be rotated to enable the practitioner to view the patient's fundus at a desired wavelength in the visible light range.

It is another object of the present invention to provide a monocular indirect ophthalmoscope which includes focusing means for imaging the patient's retina on the practitioner's retina. The focusing means is continuously variable and is operated by a control mounted on the instrument handle so that the practitioner has an uninterrupted view through the instrument while making a focus adjustment.

Still a further object of the present invention is to provide a monocular indirect ophthalmoscope wherein the instrument carries a forehead rest, the rest placing the practitioner's eye at the proper distance along the viewing axis of the instrument from the optical system and enabling the practitioner to hold the instrument in a steady state during the examination.

In general, the monocular indirect ophthalmoscope of the present invention includes an instrument housing comprising two interconnected sections. One of the these sections may be termed the viewing section and is interposed directly between the eye of the patient which is undergoing examination and a single viewing eye of the practitioner. The other section of the instrument housing may be designated the illumination section since it contains a light element, a power connector for illuminating the light element, and a condensing lens system interposed along the light path from the light source to the patient's eye.

The illumination section is contained within a hollow cylindrical body which additionally serves as a handle for the instrument, and on which are mounted the several controls for operating various mechanisms of the instrument.

As has been briefly mentioned, the illumination section includes a light bulb adapted to provide a high intensity light beam, as well as a lamp socket with a power connector adapted to be linked to an external source of power.

The illumination section further includes a condensing lens system which focuses the filament of the light element at the pupil of the patient's eye. An iris diaphragm is located along the optical axis between the light element and the condensing lens system and variation of the diaphragm aperture controls the area of illumination of the fundus. The diaphragm is controlled by a lever which is externally mounted on the instrument handle so that the practitioner may operate this lever while holding the instrument with one hand and examining the patient's eye. The diaphragm aperture is continuously variable over its entire range.

Interposed between the iris diaphragm and condensing lens system is a battery of filters carried on a filter dial. The dial is rotatably mounted so that any selected one of the filters may be placed along the optical axis. The filters permit the practitioner to conduct his examination at various wavelengths to enhance viewing of the fundus.

The instrument housing has a bridge which carries a beam splitter to reflect the light beam from the light element through the pupil of the patient's eye and to the fundus and to pass light emerging from the fundus along the optical path of the viewing section.

The viewing section of the instrument carries an optical system which transmits the image from the illuminated fundus to the eye of the practitioner. As the bundle of rays from the illuminated fundus passes out of the patient's eye and along the optical axis of the viewing section of the instrument, said rays first encounter the beam splitter, as was previously mentioned. Due to the orientation of the beam splitter, a component of these rays passes through the beam splitter and along the optical axis of the viewing section. The portion of the light rays passing along the optical axis traverses the objective of a viewing system contained within the viewing section which focuses the image at a back focal plane. The image of the fundus at this point is aerial, inverted and reversed. An erecting lens system also situated along the optical axis of the viewing section erects the fundus image so that it will be presented to the practitioner as it would be seen with a direct ophthalmoscope. The viewing system has a magnification less than unity and will hereinafter be appropriately denominated as a "demagnifying lens system."

The demagnifying lens system forms an image on the practitioner's retina and includes an eyepiece which is shiftable along the optical axis of the viewing section to focus the image. The movement of the eyepiece is controlled by a lever also mounted on the handle of the instrument and thus the practitioner can properly focus the system while still holding the instrument with one hand. The ability of the practitioner to shift the eyepiece enables the attainment of a proper focus even if the patient's eye or the practitioner'eye is ametropic.

The demagnifying lens system of the viewing section enables only a small area of the pupil of the patient's eye to be utilized for viewing purposes. More specifically, the demagnifying lens system is 1/3X, reducing the total magnification of the system from 15X with the eye unaided to 5X with the instrument. This feature is especially valuable in the examination of patients with small pupils.

The viewing section has a stop which defines a pupil aperture. The aperture is presented at the pupil of the patient's eye and at the pupil of the practitioner's eye and defines the area on the patient's pupil through which the rays from the patient's retina pass to the practitioner. The stop assures proper separation of illumination and viewing axes. If this stop were not present in the system, the avoidance of the reflections from the cornea would be significantly more difficult.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of the ophthalmoscope of the present invention, shown in use by a practitioner examining the retina of a patient;

FIG. 2 is a schematic view of the optical system of the ophthalmoscope;

Figure 3:
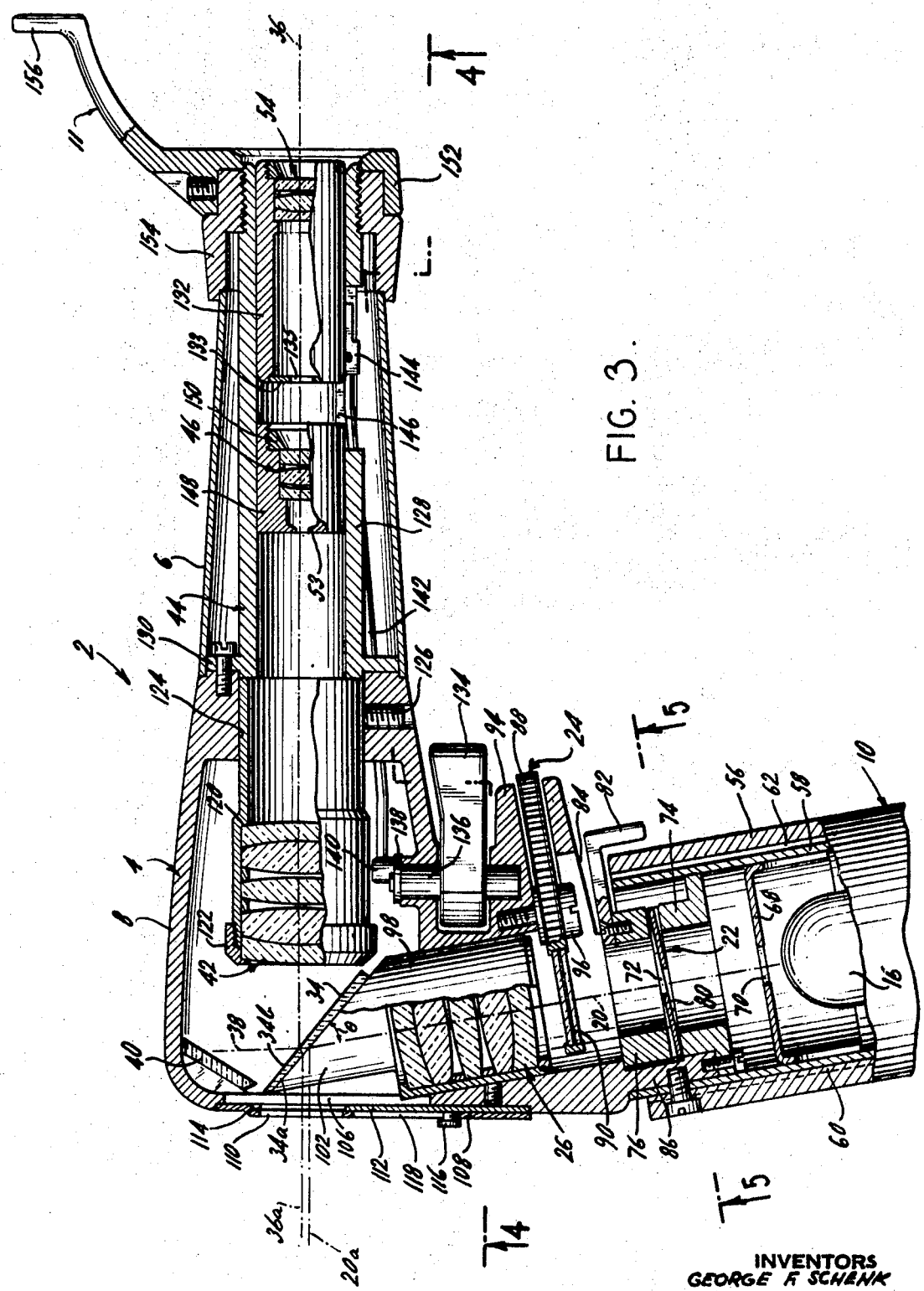
FIG. 3 is a vertical cross-sectional view of the ophthalmoscope passing through the optical axes thereof.
Figure 4:
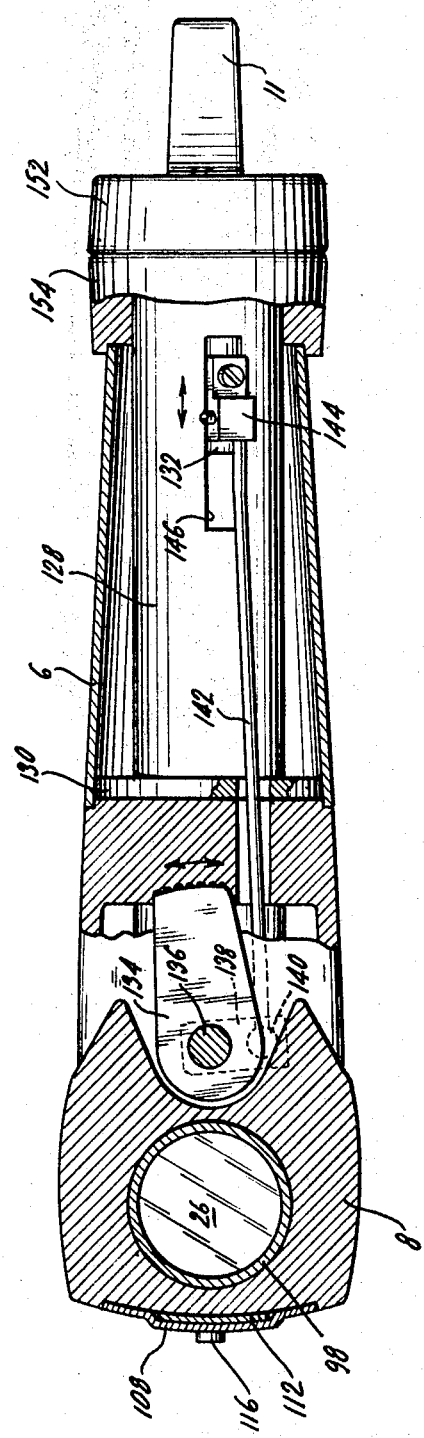
Figure 6:
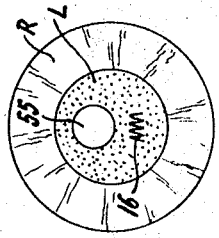
Figure 5:
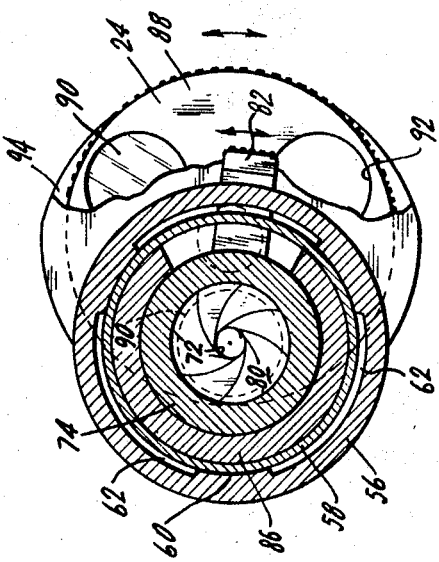

FIGS. 4 and 5 are transverse cross-sectional views taken substantially along the lines 4—4 and 5—5 of FIG. 3; and FIG. 6 is a schematic view of the patient's pupil while undergoing examination.

Referring initially to FIG. 1, this figure shows a monocular indirect ophthalmoscope 2 constructed in accordance with the principles of the present invention and being utilized by a practitioner in an examination of the retina of a patient. The ophthalmoscope has a housing 4 which includes as components a telescope body 6, a bridge 8 and a handle 10. The telescope body 6 is interposed between the patient's eye P and the practitioner's (observer's) eye O. As illustrated, one hand of the practitioner grips the instrument by its handle 10 with the thumb of the practitioner's hand being free to manipulate the various controls of the instrument. A forehead rest 11 attached to the end of the telescope body 6 fixes the distance between the practitioner's eye O and the viewing end of the instrument.

FIG. 2 illustrates schematically the optical system utilized in the present ophthalmoscope. The optical system may conveniently be divided into two optical subsystems, the first of these being an illumination subsystem 12 which primarily functions to transmit a light beam of the desired intensity, diameter and wavelength through the pupil of the patient's eye and to focus the same on the fundus of the patient's eye. The other subsystem of the ophthalmic optical system is a viewing subsystem 14, which collects the rays from the illuminated fundus, transmits and demagnifies the illuminated image, renders the image erect, and focuses this image to fall upon the retina of the practitioner's eye.

The illumination subsystem 12 includes a light-emitting element 16. A rheostat 18 is connected in series with the light element and enables the practitioner to continuously vary the intensity of the illumination during an examination. The light rays from the light element follow a path along an optical axis 20 within the illumination subsystem 12.

The illumination subsystem 12 further includes an iris diaphragm 22 which is of variable aperture size. A change in the aperture diameter correspondingly changes the size of the field of view of the patient's retina. The diameter of the aperture may likewise be altered over a continuous range during an examination.

The illumination subsystem 12 further includes an iris diaphragm 22 which is of variable aperture size. A change in the aperture diameter correspondingly changes the size of the field of view of the patient's retina. The diameter of the aperture may likewise be altered over a continuous range during an examination.

The illumination subsystem 12 further includes a battery 24 of filters along the axis 20 which enables the practitioner to rotate either an open aperture, a blue filter or a yellow filter into this light path for a special viewing purpose. The blue filter absorbs light from the red end of the visible light spectrum so that the contrast of the retinal vessels and small hemorrhages in the patient's eye is enhanced. The yellow filter produces a light beam that is very nearly monochromatic and is near the maximum of the sensitivity curve of the eye. Better retinal images result because such illumination reduces the chromatic aberration of the patient's and observers's eye and the fine details of the macula are more readily observed.

A condensing lens system 26 is situated along the optical axis 20 and serves to gather the rays from the light-emitting element 16 and focus them approximately in the plane of the iris of the patient's eye. When the light is thus focused, the fundus is brightly and evenly illuminated. The condensing lens system comprises a positive cemented doublet 28 including lenses $C_1$ and $C_2$, a biconvex singlet 30 comprising a lens $C_3$, and another positive cemented doublet 32 comprising lenses $C_4$ and $C_5$. The lenses of the condensing lens system 26 have characteristics as shown in the following table, wherein the thickness T and the radius R are given in millimeters and wherein $N_D$ is the refractive index for the sodium D line and $\nu$ is the Abbe number.

| | $N_D$ | $\nu$ | T | R |
|---|---|---|---|---|
| Lens: | | | | |
| $C_1$ | 1.7506 | 27.80 | 3.00 | $R_1=69.94$ |
| $C_2$ | 1.517 | 64.50 | 5.00 | $R_2=26.90$ |
| | | | | $R_3=42.57$ |
| $C_3$ | 1.620 | 60.3 | 3.60 | $R_4=70.00$ |
| | | | | $R_5=70.00$ |
| $C_4$ | 1.517 | 64.50 | 5.00 | $R_6=42.57$ |
| $C_5$ | 1.7506 | 27.80 | 3.00 | $R_7=26.90$ |
| | | | | $R_8=69.94$ |

The rays from the light element 16 passing along the optical axis 20 after exiting from the condensing lens system 26 strike a beam splitter 34 and are partially reflected into the pupil of the patient's eye along an optical axis 20a so as to illuminate his retina. The component transmitted through the beam splitter 34 passes along the axis 38 and falls against a black glass mirror 40 constituting a light trap and plays no further part in the present optical system. The optical axis 20a from the beam splitter 34 to the patient's eye forms an angle of approximately 100° with the optical axis 20 from the light emitting source 16 to the beam splitter 34. The image of the light element in the plane of the patient's pupil is approximately 0.90 mm. in diameter.

The bundle of rays from the illuminated fundus then returns through the patient's pupil along an optical axis 36a. The axis 20a of the light rays entering the patient's pupil and the axis 36a of the light rays emerging from the pupil diverge at a minimal acute angle in the order of ¼° and are thus essentially parallel. The exiting light rays again encounter and pass through the beam splitter 34 and a component of the light rays is transmitted along the optical axis 36, the other component being reflected back along axis 20.

The light rays passing along the optical axis 36 after leaving the beam splitter 34 are transmitted through an objective lens system 42 of a demagnifying lens system 14. The objective lens system 42 images the patient's fundus at a point between it and an erecting lens system 46 and forms at this point an inverted aerial image.

The objective lens system 42 comprises a positive cemented doublet 48 comprising lens $O_1$ and $O_2$, a biconvex singlet 50 comprising a lens $O_3$, and another positive cemented doublet 52 comprising lenses $O_4$ and $O_5$. The characteristics of lenses $O_1$ through $O_5$ (with radii $R_9$ through $R_{16}$) are the same as those of lenses $C_1$ through $C_5$, respectively.

The erecting lens system 46 serves to erect and reverse the fundus image. The erecting lens system comprises a convex-concave lens $E_1$, a biconvex lens $E_2$, and a planoconvex lens $E_3$. The characteristics of these lenses are shown in the following table, wherein the thickness T and the radius R are given in millimeters.

| | $N_D$ | $\nu$ | T | R |
|---|---|---|---|---|
| Lens: | | | | |
| $E_1$ | 1.7506 | 27.80 | 1.5 | $R_{17}=11.2$ |
| | | | | $R_{18}=5.74$ |
| $E_2$ | 1.620 | 60.3 | 2.5 | $R_{19}=8.00$ |
| | | | | $R_{20}=8.00$ |
| $E_3$ | 1.517 | 64.5 | 2.5 | $R_{21}=17.045$ |

A stop 53 having an aperture 55 is situated along the optical axis 36. The stop is presented at both the patient's eye and the practitioner's eye and assures the desired alignment of the illumination and viewing axes.

The demagnifier 14 further includes an eyepiece lens system 54 which focuses the erected image on the observer's retina. The eyepiece comprises a cemented doublet including lenses $I_1$ and $I_2$, and a planoconvex lens $I_3$. The lenses are contained in a cell 132, including a stop 133 at its forward end. The characteristics of the lenses of the eyepiece lens system 54 are set forth in the following table, wherein the thickness T and the radius R are given in millimeters.

| | $N_D$ | $\nu$ | T | R |
|---|---|---|---|---|
| Lens: | | | | |
| $I_1$ | 1.7506 | 27.8 | 1.50 | $R_{22}=250.1$ |
| | | | | $R_{23}=15.35$ |
| $I_2$ | 1.670 | 47.2 | 2.50 | $R_{24}=18.07$ |
| $I_3$ | 1.517 | 64.5 | 2.0 | $R_{25}=80.07$ |
| | | | | $R_{26}=108.60$ |

The eyepiece 54 is shiftable along the optical axis 36 toward and away from the erecting lens system 46 by appropriate mechanical means, later to be more fully described, which are controlled by the hand of the practitioner holding the ophthalmic instrument. The adjustability of the eyepiece enables proper focusing and corrects for ametropia in the patient's eye and/or in the practitioner's eye.

FIG. 6 illustrates somewhat schematically the patient's eye undergoing an ophthalmic examination through the use of the instrument 10. The patient's pupil L, surrounded by the iris R, contains both an image of the stop aperture 55 and an image of the lamp element 16 projected into the pupil's plane. It will be seen that since the area of the image of the stop aperture 55 is small as compared to the area of the pupil L and "fits" easily therein, there is ample room remaining in a small pupillary aperture for the image of the lamp element 16, and these images are distinctly separate.

Referring now to the mechanical construction of the ophthalmoscope and particularly to FIGS. 3, 4 and 5, the handle 10 of the illumination system includes a cylindrical external shell 56 having an internal cylindrical liner 58. The shell 56 has a number of internal longitudinal ribs 60 which space the shell from the liner to create a number of air chambers 62 which open to the atmosphere. These air chambers insulate the exterior of the handle from the heat generated by the light-emitting element 16.

The light-emitting element 16 comprises a light bulb which is desirably a 6.5 volt, 10 watt lamp. The lamp is carried within the handle by a conventional socket (not shown) and the socket as well as the socket body 64 (see FIG. 1) are retained in the handle by a bayonet mounting. A rheostat 18 of conventional design is situated at the lower end of the handle and enables the practitioner to vary the illumination produced by the lamp. The control knob 66 of the rheostat is exposed at the lower end of the handle 10, and the practitioner may rotate the knob 66 while he is holding the instrument in one hand. A line cord 67 (see FIG. 1) connects the bulb to a source of power. Desirably, the adjacent end of the cord includes a plug which engages a plug receptible within the socket housing. Alternatively, the handle 10 may comprise a battery case to house a number of batteries. These would be connected to the bulb 16 by well-known known circuit means providing a portable instrument.

A transverse wall 68 fixed within the liner 58 has a central aperture 70 which serves as a maximum opening for the light beam which passes from the light element 16 along the optical axis 20.

An iris diaphragm 22 is also situated within the liner 58 above the transverse wall 68. The diaphragm defines an internal aperture 72 which is of variable diameter. The diaphragm is essentially conventional and includes a base 74, a rotatable diaphragm ring 76 and a number of hinged leaves 80. An L-shaped lever 82 (FIGS. 1, 3 and 5) is fixed to the ring 76 and is situated at the upper end of the handle. The lever is exposed at the rear of the bridge 8 and is situated adjacent the thumb of the practitioner's hand when he is holding the instrument. The lever passes from the ring 76 through a rearward opening 84 in the instrument between the handle 10 and the bridge 8. Movement of the lever in one direction increases the aperture size and countermovement of the lever decreases the aperture size, so that the practitioner can control the size of the aperture and thus control the size of the field of view during an examination.

The bridge 8 is attached to the handle 10 by a lower cylindrical extension 86 which is fixed within the upper portion of the liner 58. The interior of the bridge is hollow and mounts a number of other components of the ophthalmoscope.

The bridge carries a battery 24 of filters (see FIGS. 3 and 5). Said battery comprises a circular filter dial 88 which carries a pair of filters 90 and has a clear aperture 92. The dial 88 is mounted for rotation on a wall 94 of the bridge by a headed screw 96. Upon rotation of the dial 88, any desired one of the filters 90 or the aperture 92 may be brought into alignment along the optical axis 20. An edge portion of the dial 88 (see FIG. 5) is always exposed at a location immediately above the lever 82 at the rear of the bridge 8 and is conveniently located for manipulation by the thumb of the hand of the practitioner. The filters 90 include a red-free filter, blue in color which absorbs light from the red end of the spectrum and thus serves to increase the contrast of retinal vessels and small hemorrhages with the remainder of the patient's retina, and a yellow filter which produces a light beam that is essentially monochromatic and is near the maximum of the sensitivity curve of the eye. The yellow filter produces sharper retinal images so that the fine details of the macula are more readily observed.

The condensing lens system 26 is also situated within the bridge 8 and is carried by a lens mount 98 which is secured to the interior of the bridge. The condensing lens system was fully described in connection with the optical system shown in FIG. 2 and the lenses of the condensing system are retained within the mount 98 in a conventional manner.

A beam splitter 34 is situated within the bridge 8 and forms, with its forward face 34a, an acute angle $\theta$ with the optical axis 20 so that it reflects light rays from the light-emitting element 16 passing along the optical axis 20 towards the patient along the optical axis 20a. The beam splitter 34 is cemented in place against the upper periphery of a cylindrical extension 102 of the mount 98. The beam splitter is wedge-shaped in cross section, and its faces 34a, 34b define an angle of approximately 28 minutes. The narrower edge of the wedge is approximately 1.05 mm. in thickness. The forward face 34a of the beam splitter is coated with titanium dioxide for 55 percent to 65 percent light reflection, and the rearward face 34b is coated with a layer of magnesium fluoride. The beam splitter is actually wedged to eliminate a "ghost" filament from the rear surface of the beam splitter.

To permit the aforesaid light rays to pass outwardly from the bridge, the front wall of the bridge defines a large aperture 106, a portion of which is covered by a face plate 108. (See FIGS. 3 and 4.) The face plate 108 also has a central aperture 110, through which the optical axis 20a passes. To close this aperture 110 whenever the instrument is not in use, a dust shield 112 is slidably mounted on the front wall of the bridge. The dust shield slides in a channel 114 formed between the face plate 108 and the front wall of the bridge, and the shield carries a stud 116 which slides in a slot 118 formed in the plate 108. The dust shield is slid upwardly and downwardly to respectively close and open the aperture 110.

The black glass mirror 40 is situated above the beam splitter 34 and is cemented in place against the interior surface of the bridge 8. Said interior surface of the bridge 8 has a black surface, and with the black glass mirror comprises a light trap which will reflect without diffusion and then entrap any light rays passing to it from the beam splitter 34 along the axis 38.

The lenses of the objective lens system 42, previously described, are fixed within an objective mount 120 in a conventional manner and a retainer 122 is fixed to the forward end of the mount to secure the lenses therein. The rearward end of the mount 120 is retained in an aperture 124 at the rearward end of the bridge 8 by a setscrew 126. An eyepiece tube 128 encloses both the erecting lens system 46 and the eyepiece lens system 54. The tube has a circular flange 130 at its forward end which is fixed to the rearward end of the bridge 8. The telescope body 6 is retained in place over the flange 130. The lenses of the eyepiece lens system are fixed within an elongated cylindrical eyepiece mount 132 which makes a sliding fit with the interior of the eyepiece tube 128. The forward end of the mount 132 carries a plate 133 with an internal aperture 135.

The eyepiece mount 132 carrying the eyepiece lens system is shiftable within the eyepiece tube 128 along the optical axis 36. To this end, a focus lever 134 (see FIGS. 3 and 4) is exposed at the rear of the bridge 8 (FIG. 1) so that it may be readily manipulated by the thumb of the hand of the practitioner, while that hand is holding the instrument. The lever 134 is mounted on a pivot pin 136 which is journaled on both of its ends in internal walls of the bridge 8. A crank 138 is fixed to the upper end of the pivot pin 136 and the crank carries a key 140. The key 140 is rotatably mounted on the crank 138 and is fixed to one end of an elongated focus rod 142. The other end of the focus rod 142 is secured to a slide 144 which is fixed to a lower portion of the eyepiece mount 132. The slide 144 reciprocates in a slot 146 formed in the eyepiece tube 128. As the lever 134 is rotated clockwise or counterclockwise by the practitioner, the eyepiece mount 132, by the crank 138 and the focus rod 142, is reciprocated forwardly and rearwardly, and thus the eyepiece lens system 54 is shifted along the optical axis 36. This enables the practitioner to bring the patient's retina into sharp focus.

The erector mount 148 has a portion 53 of reduced internal diameter at its end closest to the beam splitter 34. The portion 53 comprises the stop, shown in FIG. 1, which limits the diameter of the optical pupil image at the patient's eye, as previously mentioned.

The viewing section further includes the erecting lens system 46 and the lenses of this system are secured within an erector mount 148 by a retainer 150. The erector mount is fixed in place within the eyepiece tube. As previously mentioned, the erecting lens system serves to erect the reversed inverted aerial image which has passed through the objective lens system.

The forehead rest 11 includes a cylindrical hub 152 which is secured to an eyepiece cap 154. The cap encircles the eyepiece tube 128 and is fixed to the end of said tube. The cap 154 engages the rearward end of the body 6. The forehead rest has a foot 156 which is to be placed against the forehead of the practitioner for the purpose of setting the correct distance between the practitioner's eye and the viewing end of the instrument (see FIG. 1).

From the foregoing description, it will be apparent the instrument is used (see FIG. 1) by the practitioner holding the handle 10 of the instrument with one hand, placing the foot 156 of the rest 11 against his forehead so that the instrument is properly oriented with respect to his eye O. The bulb 16 has been previously energized. The light intensity is set by rotation of the rheostat knob 66. The face plate 108 of the instrument is placed approximately 18 mm. from the patient's eye P, and the instrument is properly focused on the patient's retina by manipulation of the focusing lever 134. By rotation of the filter dial 88, the practitioner may either choose a red-free filter, a yellow filter, or a clear aperture. The size of the illuminated field on the patient's retina is determined by manipulation of the diaphragm lever 82.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

We claim:

1. An ophthalmoscope for projecting a view of the fundus of a patient's eye through the patient's pupil to the practitioner through his pupil, the ophthalmoscope having an optical system comprising an illumination system on a folded illumination axis, a viewing system on a viewing axis, said axes converging at the fundus, and a beam splitter, the illumination system including a light-emitting element and a condensing lens system for transmitting light rays from said element along the illumination axis to the beam splitter, the beam splitter reflecting said rays through the patient's pupil to illuminate the fundus, and the viewing system including a demagnifying lens system along the viewing axis, the beam splitter partially reflecting rays passing along the illumination axis, the demagnifying lens system including an objective to provide a real image of the patient's fundus and an erecting lens to erect and reverse said image, and means for focusing the image of the patient's fundus, wherein the condensing lens system comprises lenses having characteristics as set forth in the following table, wherein thickness (T) and radii (R) are given in millimeters:

| Lens: | $N_D$ | $\nu$ | T | R |
|---|---|---|---|---|
| $C_1$ | 1.7506 | 27.80 | 3.00 | $R_1=69.94$ |
| $C_2$ | 1.517 | 64.50 | 5.00 | $R_2=26.90$ |
| | | | | $R_3=42.57$ |
| $C_3$ | 1.620 | 60.3 | 3.60 | $R_4=70.00$ |
| | | | | $R_5=70.00$ |
| $C_4$ | 1.517 | 64.50 | 5.00 | $R_6=42.57$ |
| | | | | $R_7=26.90$ |
| $C_5$ | 1.7506 | 27.80 | 3.00 | $R_8=69.94$ | wherein the demagnifying lens system includes an objective lens system and an erecting lens system, the objective lens system and erecting lens system comprising lenses having characteristics as set forth in the following tables, respectively, wherein thickness (T) AND RADII (R) are given in millimeters:

| Lens: | $N_D$ | $\nu$ | T | R |
|---|---|---|---|---|
| $O_1$ | 1.7506 | 27.80 | 3.00 | $R_9=69.94$ |
| $O_2$ | 1.517 | 64.50 | 5.00 | $R_{10}=26.90$ |
| | | | | $R_{11}=42.57$ |
| $O_3$ | 1.620 | 60.30 | 3.60 | $R_{12}=70.00$ |
| | | | | $R_{13}=70.00$ |
| $O_4$ | 1.517 | 64.50 | 5.00 | $R_{14}=42.57$ |
| | | | | $R_{15}=26.90$ |
| $O_5$ | 1.7506 | 27.80 | 3.00 | $R_{16}=69.94$ |

| Lens: | $N_D$ | $\nu$ | T | R |
|---|---|---|---|---|
| $E_1$ | 1.7506 | 27.80 | 1.5 | $R_{17}=11.2$ |
| | | | | $R_{18}=5.74$ |
| $E_2$ | 1.620 | 60.3 | 2.5 | $R_{19}=8.00$ |
| | | | | $R_{20}=8.00$ |
| $E_3$ | 1.517 | 64.5 | 2.5 | $R_{21}=17.045$ | and wherein the eyepiece lens system comprises lenses having characteristics as set forth in the following table, wherein thickness (T) and radii (R) are given in millimeters:

| Lens: | $N_D$ | $\nu$ | T | R |
|---|---|---|---|---|
| $I_1$ | 1.7506 | 27.8 | 1.50 | $R_{22}=250.1$ |
| | | | | $R_{23}=15.45$ |
| $I_2$ | 1.670 | 47.2 | 2.50 | $R_{24}=18.07$ |
| $I_3$ | 1.517 | 64.5 | 2.0 | $R_{25}=80.07$ |
| | | | | $R_{26}=108.60$ |

2. A unitary portable ophthalmoscope for observing the fundus of a patient's eye, including:
an angular housing including a handle, a viewing tube, and a bridge member disposed between and joined to said handle and said viewing tube,
an illumination system disposed within said housing along a folded illumination axis and including in series a light source, a variable iris, a battery of filters selectively positionable in said illumination axis, a condensing lens, and a partial reflector to reflect light from said source and toward said fundus, said iris and said battery having external control means,
a viewing system disposed within said housing along a straight viewing axis and including in series said partial reflector, an objective lens, an erector lens, and an axially movable eyepiece, said eyepiece being operatively connected for axial movement to an external control means,
the control means for the iris, battery, and eyepiece being disposed in juxtaposition for operation by a single digit of the user,
said condenser effective to concentrate light on the fundus under observation,
said objective lens effective to receive, through said partial reflector, light reflected from the fundus and to inversely image said fundus at the focal plane of said objective along said viewing axis,
said erector lens effective to erect the inverse image and,
said eyepiece effective to demagnify and conjugate the erected image at the pupil of an observer.